(12) United States Patent
Sundaresan et al.

(10) Patent No.: US 10,700,861 B2
(45) Date of Patent: Jun. 30, 2020

(54) SYSTEM AND METHOD FOR GENERATING A RECOVERY KEY AND MANAGING CREDENTIALS USING A SMART BLOCKCHAIN CONTRACT

(71) Applicant: Workday, Inc., Pleasanton, CA (US)

(72) Inventors: Prakash Sundaresan, Redmond, WA (US); Lionello G. Lunesu, Peng Chau (HK); Antoine Cote, Sheung Wan (HK)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 16/147,842

(22) Filed: Sep. 30, 2018

(65) Prior Publication Data
US 2019/0036692 A1    Jan. 31, 2019

Related U.S. Application Data

(63) Continuation-in-part of application No. 15/662,417, filed on Jul. 28, 2017.
(Continued)

(51) Int. Cl.
| | |
|---|---|
| *H04L 9/08* | (2006.01) |
| *H04L 9/06* | (2006.01) |
| *H04L 9/30* | (2006.01) |
| *H04L 9/32* | (2006.01) |

(52) U.S. Cl.
CPC .......... *H04L 9/0894* (2013.01); *H04L 9/0637* (2013.01); *H04L 9/0643* (2013.01);
(Continued)

(58) Field of Classification Search
CPC ... H04L 9/0894; H04L 9/3226; H04L 9/0825; H04L 9/3247; H04L 9/3271; H04L 63/0807; H04L 63/0823
See application file for complete search history.

(56) References Cited

U.S. PATENT DOCUMENTS

| | | |
|---|---|---|
| 9,397,980 B1 | 7/2016 | Chen |
| 2008/0010449 A1 | 1/2008 | Holtzman |
| (Continued) | | |

FOREIGN PATENT DOCUMENTS

| | | |
|---|---|---|
| GB | 2539430 | 7/2015 |

OTHER PUBLICATIONS

Andreas M. Antonopoulos, Mastering Bitcoin Programming the Open Blockchain, Jun. 1, 2017, O'Reilly, 2nd Edition, Chapter 5 (Year: 2017).*

(Continued)

*Primary Examiner* — Ellen Tran
(74) *Attorney, Agent, or Firm* — Van Pelt, Yi & James LLP (57) ABSTRACT

A processor implemented method for generating a recovery key for a first device associated with a user and conditionally registering an identifier of the recovery key in a blockchain is provided. The method includes the steps of generating, using a first cryptographic processor on the first device associated with the user, a first set of credentials; generating a mnemonic sentence from pseudorandom data; applying a key derivation algorithm to generate the recovery key and conditionally registering an identifier of the recovery key for the first public key of the first device in a smart contract in the blockchain. The first set of credentials includes a first blockchain-compatible public-private key pair associated with the user. The first blockchain-compatible public-private key pair includes a first public key and a first private key. The first private key is restricted to the first cryptographic processor on the first device.

17 Claims, 7 Drawing Sheets

Related U.S. Application Data (60) Provisional application No. 62/368,875, filed on Jul. 29, 2016, provisional application No. 62/489,772, filed on Apr. 25, 2017, provisional application No. 62/557,331, filed on Sep. 29, 2017.

(52) U.S. Cl.
CPC .......... *H04L 9/3073* (2013.01); *H04L 9/3226* (2013.01); *H04L 9/3239* (2013.01); *H04L 9/3242* (2013.01); *H04L 9/3247* (2013.01); *H04L 2209/38* (2013.01)

(56) References Cited

U.S. PATENT DOCUMENTS

| | | |
|---|---|---|
| 2010/0138652 A1 | 6/2010 | Sela |
| 2016/0086175 A1 | 3/2016 | Finlow-Bates |
| 2016/0261411 A1 | 9/2016 | Yau |
| 2016/0275461 A1* | 9/2016 | Sprague ............ G06Q 20/0655 |
| 2017/0147808 A1 | 5/2017 | Kravitz |
| 2017/0155513 A1 | 6/2017 | Acar |
| 2017/0180128 A1* | 6/2017 | Lu ............................ H04L 9/08 |
| 2017/0222815 A1 | 8/2017 | Meriac |
| 2017/0344988 A1 | 11/2017 | Cusden |
| 2017/0357966 A1 | 12/2017 | Chandrasekhar |
| 2018/0006826 A1 | 1/2018 | Smith |
| 2019/0266334 A1* | 8/2019 | Robison ................ G06F 21/602 |

OTHER PUBLICATIONS

Alex Biryukov et al., Argon2: new generation of memory-hard functions for password hashing and other applications, 2016, IEEE, pp. 292-300 (Year: 2016).*

* cited by examiner

```
┌─────────────────────────────────────────────────────┐
│ APPLYING AN ENTROPY FUNCTION ON THE PSEUDORANDOM DATA│
│ TO OBTAIN A CRYPTOGRAPHICALLY SECURED PSEUDORANDOM  │
│                       DATA                          │
│                       502                           │
└─────────────────────────────────────────────────────┘
                          │
                          ▼
┌─────────────────────────────────────────────────────┐
│ APPLYING A FIRST CRYPTOGRAPHIC HASH FUNCTION ON THE │
│ CRYPTOGRAPHICALLY SECURED PSEUDORANDOM DATA TO      │
│ OBTAIN A HASH VALUE HAVING AT LEAST ONE BIT         │
│                       504                           │
└─────────────────────────────────────────────────────┘
                          │
                          ▼
┌─────────────────────────────────────────────────────┐
│ APPLYING A CHECKSUM FUNCTION ON THE AT LEAST ONE BIT OF│
│       THE HASH VALUE TO OBTAIN A CHECKSUM           │
│                       506                           │
└─────────────────────────────────────────────────────┘
                          │
                          ▼
┌─────────────────────────────────────────────────────┐
│ APPENDING THE CHECKSUM TO THE HASH VALUE TO OBTAIN A│
│                 PLURALITY OF BITS                   │
│                       508                           │
└─────────────────────────────────────────────────────┘
                          │
                          ▼
┌─────────────────────────────────────────────────────┐
│ DIVIDING THE PLURALITY OF BITS INTO A PLURALITY OF GROUPS│
│ AND EACH GROUP CORRESPONDS TO A NATURAL LANGUAGE    │
│ WORD, TO OBTAIN A LIST OF NATURAL LANGUAGE WORDS    │
│                       510                           │
└─────────────────────────────────────────────────────┘
                          │
                          ▼
┌─────────────────────────────────────────────────────┐
│ CONCATENATING THE LIST OF NATURAL LANGUAGE WORDS TO │
│           OBTAIN THE MNEMONIC SENTENCE              │
│                       512                           │
└─────────────────────────────────────────────────────┘
                                              ↖ 500
```

SYSTEM AND METHOD FOR GENERATING A RECOVERY KEY AND MANAGING CREDENTIALS USING A SMART BLOCKCHAIN CONTRACT

CROSS-REFERENCE TO RELATED APPLICATIONS

This application is a continuation of co-pending U.S. patent application Ser. No. 15/662,417, entitled BLOCKCHAIN-BASED DIGITAL IDENTITY MANAGEMENT (DIM) SYSTEM filed Jul. 28, 2017 which is incorporated herein by reference for all purposes, which claims priority to U.S. Provisional Application No. 62/368,875, entitled TRUSTED KEY BLOCKCHAIN-BASED IDENTITY MANAGEMENT SYSTEM TOWARDS A WORLD OF STRONG IDENTITY, SECURITY AND SMART CONTRACTS filed Jul. 29, 2016 which is incorporated herein by reference for all purposes, and claims priority to U.S. Provisional Application No. 62/489,772, entitled BLOCKCHAIN-BASED CREDENTIAL AND TOKEN MANAGEMENT IN THE TRUSTED KEY IDENTITY SYSTEM filed on Apr. 25, 2017 which is incorporated herein by reference for all purposes. This application also claims priority to U.S. Provisional Patent Application No. 62/557,331 entitled REVOCATION AND RECOVERY IN A DIGITAL IDENTITY MANAGEMENT SYSTEM filed Sep. 12, 2017 which is incorporated herein by reference for all purposes.

BACKGROUND

Technical Field

The embodiments herein generally relate to blockchain-based secure credential management, and more particularly, to a system and method for generating a recovery key from a mnemonic sentence and a Personal Identification Number (PIN) code to enable users to manage their own credentials, using a smart contract on a blockchain.

Description of the Related Art

Mobile devices have been increasingly associated with the identity of users to authenticate them for making payments, accessing bank accounts, email, etc. Most existing mobile devices employ the use of a password, pattern, or PIN to authenticate the user. Despite the ubiquity of password-based systems, it has many problems. An ideal password needs to be easily remembered by the user. However, in order for passwords to be secure, they should be long and hard to predict, thus making them difficult to guess.

People often use the same or a limited set of passwords across multiple sites. Consequently, a compromise or hacking at one website with poor security practices leads to compromise of the user's accounts at other sites where the user has used the same password. There are illicit websites that even offer the user's identity credentials, such as username-password credentials, for sale. Hence, security of the user's identity credentials is extremely important.

One approach to secure identity credentials is to create them in the hardware of a user device in such a way that the private key cannot be extracted from the cryptographic processor. Access to the private key may be protected by a user's biometric or PIN code. However, if the user device becomes unavailable to the user, e.g. it becomes inoperative, lost or stolen, there is no provision to recover the credentials of the first device using another device since the private key cannot be extracted from the first device by the user. Accordingly, there remains a need for users to be able to recover and replace their identity credentials independently without having to rely on a third party.

SUMMARY

In view of foregoing, embodiments herein provide a processor implemented method for generating a recovery key for a first device associated with a user and conditionally registering an identifier of the recovery key in a blockchain. The method includes the steps of: (i) generating a first set of credentials including a first blockchain-compatible public-private key pair associated with the user, using a first cryptographic processor on the first device associated with the user the first blockchain-compatible public-private key pair including a first public key and a first private key, the first private key being restricted to the first cryptographic processor on the first device, (ii) generating a mnemonic sentence from pseudorandom data, (iii) applying a key derivation algorithm that includes iteratively applying a second cryptographic hash function to the mnemonic sentence and a Personal Identification Number (PIN) code to generate the recovery key; and (iv) conditionally registering the identifier of the recovery key for the first public key of the first device in a smart contract in the blockchain.

In some embodiments, the generating the mnemonic sentence from the pseudorandom data includes (i) applying an entropy function on the pseudorandom data to obtain a cryptographically secured pseudorandom data, (ii) applying a first cryptographic hash function on the cryptographically secured pseudorandom data to obtain a hash value having at least one bit and (iii) applying a checksum function on the at least one bit of the hash value to obtain a checksum.

In some embodiments, the generating the mnemonic sentence from the pseudorandom data further includes (i) appending the checksum to the hash value to obtain a plurality of bits, (ii) dividing the plurality of bits into a plurality of groups and each group corresponds to a natural language word, to obtain a list of natural language words (iii) concatenating the list of natural language words to obtain the mnemonic sentence.

In some embodiments, the identifier of the recovery key is conditionally registered in the smart contract in the blockchain if a first cryptographic signature from the first public key of the first device applied on a hash of the recovery key and a second cryptographic signature from the recovery key applied on a hash of the first public key of the first device are verified.

In some embodiments, the smart contract registers an association between the first public key of the first device and the second public key of the second device.

In some embodiments, the smart contract in the blockchain registers the association between the first public key of the first device and the second public key of the second device if a third cryptographic signature from the second public key of the second device applied on a hash of the recovery key and a fourth cryptographic signature from the recovery key applied on a hash of the second public key of the second device are verified. The second set of credentials is generated by a second cryptographic processor on a second device. The second set of credentials include a second blockchain-compatible public-private key pair that comprises a second public key and a second private key. The second private key is restricted to the second cryptographic processor on the second device.

In some embodiments, the first cryptographic hash function and the second cryptographic hash functions are selected from at least one of a Secure Hash Algorithm (SHA) function, a Merkle-Damgard 5 (MD5) message digest algorithm function, and a Research and Development in Advanced Communications Technologies in Europe (RACE) Integrity Primitives Evaluation Message Digest (RIPEMD) algorithm function.

In some embodiments, the key generation algorithm is selected from one of a Password-Based Key Derivation Function (PBKDF), an Argon2 key derivation function, a Scrypt key derivation function, and a Lyra key generation.

In some embodiments, a processor implemented method for conditionally registering an association between a first public key of a first device and a second public key of a second device in a blockchain is provided. A first cryptographic processor on a first device associated with a user generates a first set of credentials. The first set of credentials includes a first blockchain-compatible public-private key pair associated with the user. The first blockchain-compatible public-private key pair includes the first public key and a first private key. The first private key is restricted to the first cryptographic processor on the first device. The first device generates a first recovery key and registers an identifier of the first recovery key for the first public key of the first device in a smart contract in the blockchain. The method includes the steps of: (i) generating a second set of credentials using a second cryptographic processor on the second device associated with the user, (ii) obtaining a mnemonic sentence and a Personal Identification Number (PIN) code, (iii) applying a key derivation algorithm to generate a second recovery key, and (iv) conditionally registering an association between the first public key of the first device and the second public key of the second device in a smart contract on the blockchain. The second set of credentials includes a second blockchain-compatible public-private key pair, the second blockchain-compatible public-private key pair includes the second public key and a second private key and the second private key is restricted to the second cryptographic processor on the second device. Applying the key derivation algorithm includes iteratively applying a cryptographic hash function to the mnemonic sentence and the Personal Identification Number (PIN) code In some embodiments, the smart contract in the blockchain registers the association between the first public key of the first device and the second public key of the second device if the first recovery key generated by the first device matches with the second recovery key generated on the second device. The smart contract in the blockchain may register the association between the first public key of the first device and the second public key of the second device if a first cryptographic signature from the first public key of the first device applied on a hash of the recovery key and a second cryptographic signature from the recovery key applied on a hash of the first public key of the first device are verified, and a third cryptographic signature from the second public key of the second device applied on a hash of the recovery key and a fourth cryptographic signature from the recovery key applied on a hash of the second public key of the second device are verified.

In some embodiments, a non-transitory computer readable storage medium comprising one or more computer-executable instructions that, when executed by at least one processor of the computing device causes a processor implemented method for generating a recovery key for a first device associated with a user and registering the recovery key in a blockchain, by performing the steps of: (i) generate a mnemonic sentence from pseudorandom data (ii) apply a key derivation algorithm to generate the recovery key and (iii) conditionally register an identifier of the recovery key for the first public key of the first device in a smart contract in the blockchain. Apply the key derivation algorithm includes iteratively applying a second cryptographic hash function to the mnemonic sentence and a Personal Identification Number (PIN) code.

In some embodiments, the generating the mnemonic sentence from the pseudorandom data includes (i) applying an entropy function on the pseudorandom data to obtain a cryptographically secured pseudorandom data, (ii) applying a first cryptographic hash function on the cryptographically secured pseudorandom data to obtain a hash value having at least one bit and (iii) applying a checksum function on the at least one bit of the hash value to obtain a checksum.

In some embodiments, the generating the mnemonic sentence from the pseudorandom data further includes (i) appending the checksum to the hash value to obtain a plurality of bits, (ii) dividing the plurality of bits into a plurality of groups and each group corresponds to a natural language word, to obtain a list of natural language words and (iii) concatenating the list of natural language words to obtain the mnemonic sentence.

In some embodiments, the identifier of the recovery key is conditionally registered in the smart contract in the blockchain if a first cryptographic signature from the first public key of the first device applied on a hash of the recovery key and a second cryptographic signature from the recovery key applied on a hash of the first public key of the first device are verified.

In some embodiments, the smart contract in the blockchain registers an association between the first public key of the first device and a second public key of a second device.

In some embodiments, a non-transitory computer readable storage medium comprising one or more computer-executable instructions that, when executed by at least one processor of the computing device further causes the smart contract to register an association between the first public key of the first device and a second public key of a second device in the blockchain. The smart contract registers the association between the first public key of the first device and the second public key of the second device in the blockchain if a third cryptographic signature from the second public key of the second device applied on a hash of the recovery key and a fourth cryptographic signature from the recovery key applied on a hash of the second public key of the second device are verified. The second set of credentials is generated by a second cryptographic processor on a second device, the second set of credentials include a second blockchain-compatible public-private key pair that comprises a second public key and a second private key and the second private key is restricted to the second cryptographic processor on the second device.

In some embodiments, a system for generating a recovery key for the first device associated with a user and conditionally registering an identifier of the recovery key in a blockchain is provided. The system includes a hardware-based cryptographic processor, a device processor and a non-transitory computer readable storage medium. The hardware-based first cryptographic processor generates, on the first device associated with a user, a first set of credentials including a first blockchain-compatible public-private key pair associated with the user. The first blockchain-compatible public-private key pair includes a first public key and a first private key and the first private key is restricted to the first cryptographic processor on the first device. The non-transitory computer readable storage medium storing one or more modules executable by the device processor, which when executed by the device processor, causes a method for generating a recovery key for the first device associated with a user and conditionally registering an identifier of the recovery key in a blockchain by performing the steps of: (i) generating a mnemonic sentence from pseudorandom data, (ii) applying a key derivation algorithm to generate the recovery key and (iii) conditionally registering an identifier of the recovery key for the first public key of the first device in a smart contract in the blockchain. Applying the key derivation algorithm includes iteratively applying a second cryptographic hash function to the mnemonic sentence and a Personal Identification Number (PIN) code.

In some embodiments, the generating the mnemonic sentence from the pseudorandom data includes (i) applying an entropy function on the pseudorandom data to obtain a cryptographically secured pseudorandom data, (ii) applying a first cryptographic hash function on the cryptographically secured pseudorandom data to obtain a hash value having at least one bit and (iii) applying a checksum function on the at least one bit of the hash value to obtain a checksum.

In some embodiments, the generating the mnemonic sentence from the pseudorandom data further includes (i) appending the checksum to the hash value to obtain a plurality of bits, (ii) dividing the plurality of bits into a plurality of groups and each group corresponds to a natural language word, to obtain a list of natural language words and (iii) concatenating the list of natural language words to obtain the mnemonic sentence.

In some embodiments, the identifier of the recovery key is conditionally registered in the smart contract in the blockchain if a first cryptographic signature from the first public key of the first device applied on a hash of the recovery key and a second cryptographic signature from the recovery key applied on a hash of the first public key of the first device are verified.

In some embodiments, the smart contract in the blockchain registers an association between the first public key of the first device and a second public key of a second device.

In some embodiments, the smart contract in the blockchain registers the association between the first public key of the first device and the second public key of the second device if a third cryptographic signature from the second public key of the second device applied on a hash of the recovery key and a fourth cryptographic signature from the recovery key applied on a hash of the second public key of the second device are verified. A second set of credentials is generated by a second cryptographic processor on a second device. The second set of credentials include a second blockchain-compatible public-private key pair that includes a second public key and a second private key and the second private key is restricted to the second cryptographic processor on the second device.

In some embodiments, a system for conditionally an association between a first public key of a first device and a second public key of a second device in a blockchain is provided. A first cryptographic processor on a first device associated with a user generates a first set of credentials. The first set of credentials includes a first blockchain-compatible public-private key pair associated with the user. The first blockchain-compatible public-private key pair includes the first public key and a first private key. The first private key is restricted to the first cryptographic processor on the first device. The first device generates a first recovery key and registers an identifier of the first recovery key for the first public key of the first device in a smart contract in the blockchain. The system includes a hardware-based cryptographic processor, a device processor and a non-transitory computer readable storage medium. The hardware-based second cryptographic processor generates a second set of credentials that includes a second blockchain-compatible public-private key pair. The second blockchain-compatible public-private key pair includes the second public key and a second private key. The second private key is restricted to the second cryptographic processor on the second device. The one or more non-transitory computer readable storage mediums storing the one or more sequences of instructions which when executed by the device processors, causes a method for conditionally registering an association between the first public key of the first device and the second public key of the second device in the blockchain, the method including the steps of (i) obtaining a mnemonic sentence and a Personal Identification Number (PIN) code, (ii) applying a key derivation algorithm to generate the second recovery key and (iii) conditionally registering an association between the first public key of the first device and the second public key of the second device in the smart contract in the blockchain. Applying the key derivation algorithm includes iteratively applying a cryptographic hash function to the mnemonic sentence and the Personal Identification Number (PIN) code.

In some embodiments, the smart contract registers the association between the first public key of the first device and the second public key of the second device if the first recovery key generated by the first device matches with the second recovery key generated on the second device.

In some embodiments, the smart contract in the blockchain registers the association between the first public key of the first device and the second public key of the second device if a first cryptographic signature from the first public key of the first device applied on a hash of the recovery key and a second cryptographic signature from the recovery key applied on a hash of the first public key of the first device are verified, and a third cryptographic signature from the second public key of the second device applied on a hash of the recovery key and a fourth cryptographic signature from the recovery key applied on a hash of the second public key of the second device are verified.

These and other embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. As mentioned, there remains a need for users to be able to recover their identity credentials independently without having to share them with a third party. Referring now to the drawings, and more particularly to FIGS. 1 through 7, where similar reference characters denote corresponding features throughout the figures, preferred embodiments are shown.

Figure 1:
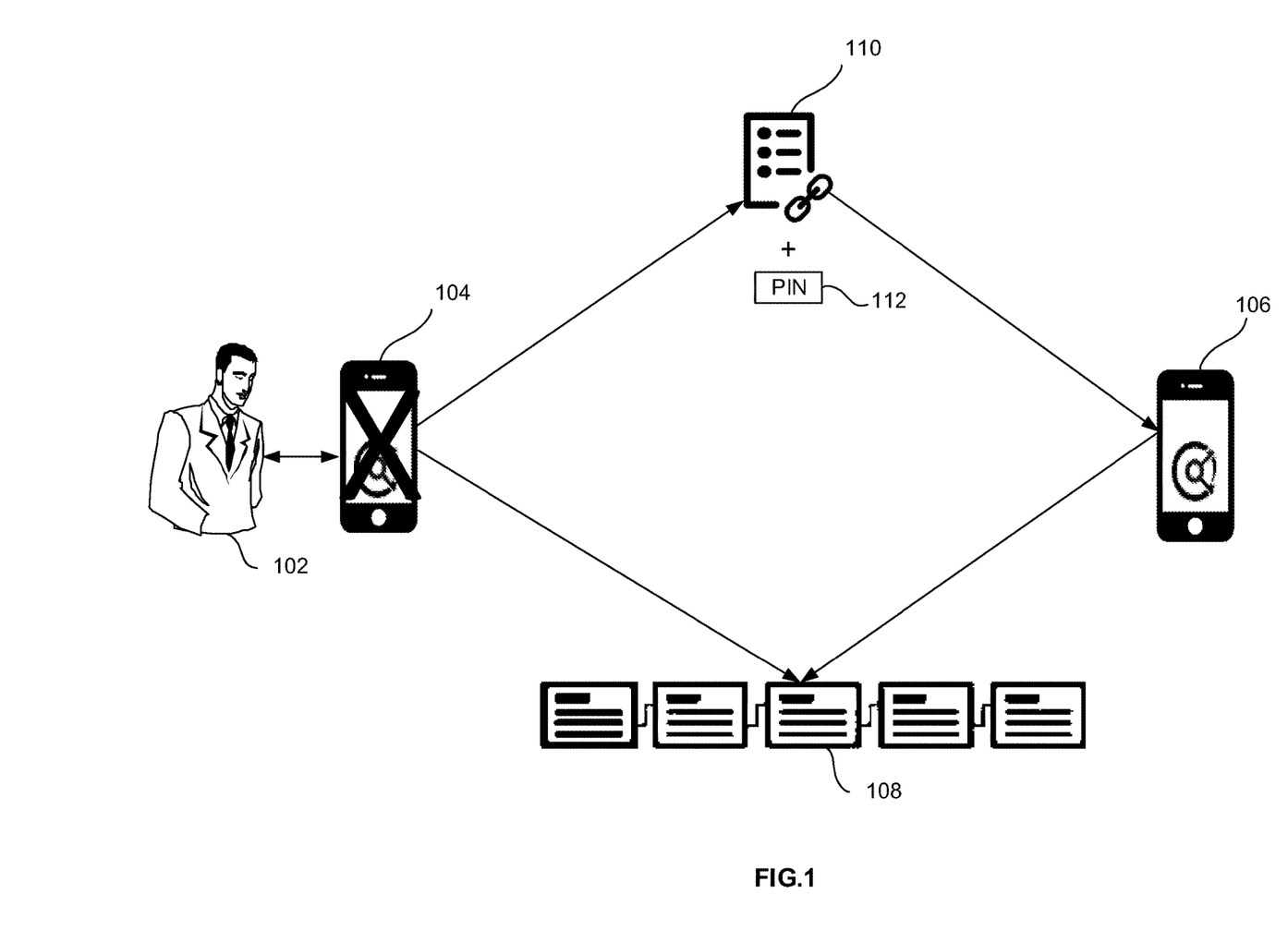
FIG. 1 illustrates a block diagram of a first device associated with a user that generates a recovery key, and registering an identifier of the recovery key in a blockchain, to enable a second device to recover credentials associated with the first device according to some embodiments herein.

FIG. 1 illustrates a block diagram of a first device 104 associated with a user 102 that generates a recovery key, and conditionally registering an identifier of the recovery key in a blockchain 108 to enable a second device 106 to recover credentials associated with the first device 104 according to some embodiments herein. A first cryptographic processor on the first device 104 associated with the user 102 generates a first set of credentials that include a first blockchain-compatible public-private key pair associated with the user 102. The first blockchain-compatible public-private key pair includes a first public key and a first private key. The first private key is restricted to the first cryptographic processor on the first device 104. A second cryptographic processor on the second device 106 generates a second set of credentials that include a second blockchain-compatible public-private key pair associated with the user 102. The second blockchain-compatible public-private key pair includes a second public key and a second private key. The second private key is restricted to the second cryptographic processor on the second device 104.

The recovery key is generated from a mnemonic sentence 110 and a Personal Identification Number (PIN) code 112 obtained from the user 102, on the first device 104. The identifier of the recovery key is conditionally registered in the blockchain 108. In some embodiments, the identifier of the recovery is a hash of the recovery key. A hash function used to generate the identifier of the recovery key may be a non-invertible and/or deterministic hash function. Since it is hard to find two inputs that hash to the same output, it would be hard to obtain the recovery key from the hash value.

The blockchain 108 stores a smart contract that conditionally registers an identifier of recovery key for the first public key of the first device 104 and also conditionally registers an identifier of recovery key for the second public key of the second device 106 and thus forms an equivalence relation between the first public key of the first device 104 and the second public key of the second device 106. In some embodiments, the first set of credentials are a username and password. In some embodiments, the second set of credentials are a username and password. In some embodiments, the blockchain is an Ethereum blockchain. In some embodiment, the blockchain is selected from one of Ethereum. Ethereum Classic, Neo and EOS.

The recovery key enables the user 102 to recover his/her credentials using the second device 106 in the event the first device 104 becomes unavailable, e.g., the first device 104 ceases operating or is lost or stolen. Since there is an equivalence relation between the first public key of the first device 104 and the second public key of the second device 106 which is stored on the smart contract in the blockchain 108, the second set of credentials can be used to replace, recover, revoke or take over the first set of credentials on the first device 104. In some embodiments, the hardware-based cryptographic processor may be a dedicated computer on a chip, e.g., a system-on-a-chip, or a microprocessor for carrying out cryptographic operations.

Figure 2:
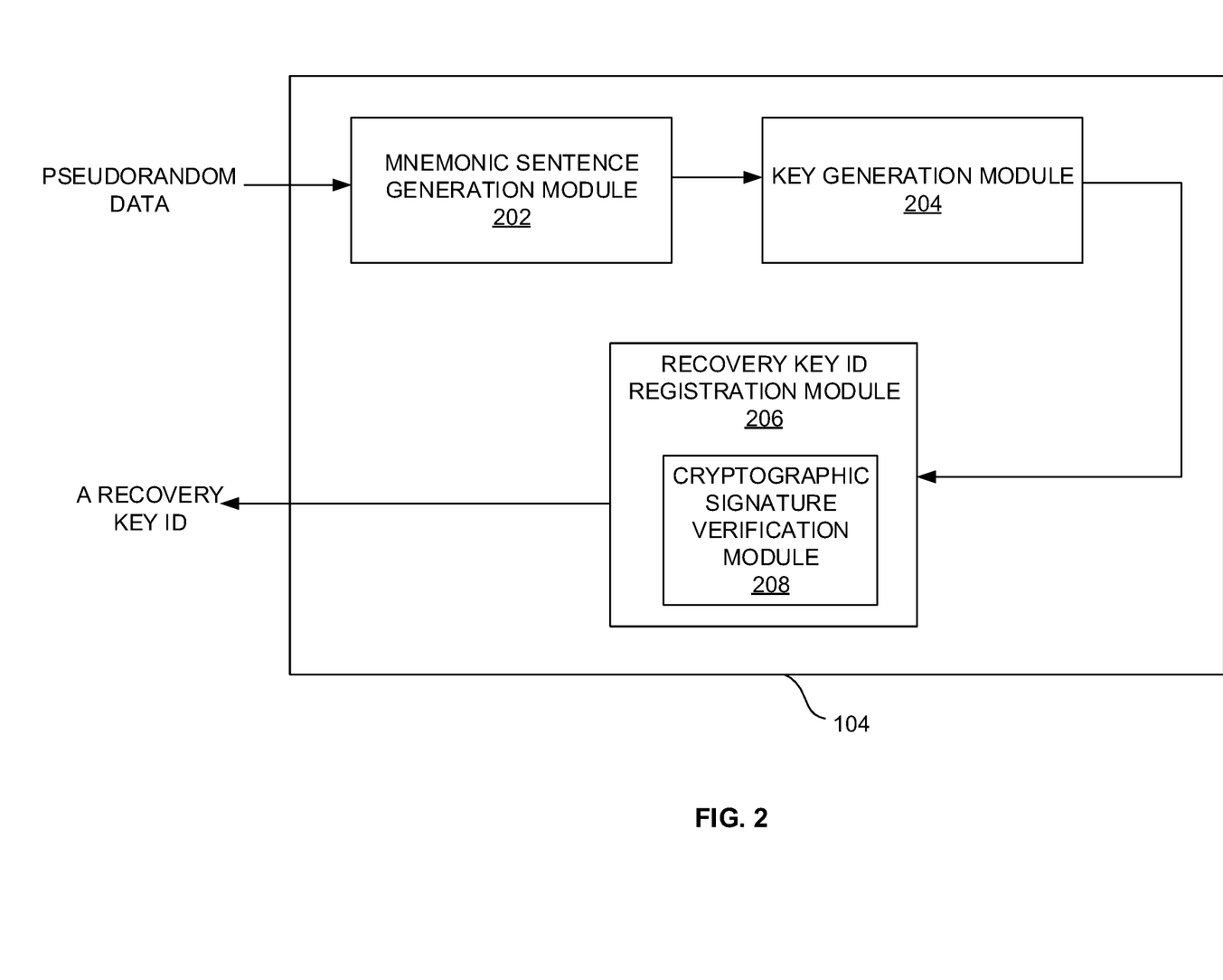
FIG. 2 is a block diagram of the first device of FIG. 1 according to some embodiments herein.

FIG. 2 is a block diagram of the first device 104 according to some embodiments herein. The first device 104 includes a mnemonic sentence generation module 202, a key generation module 204 and a recovery key identity registration module 206. The recovery key identity registration module 206 includes a cryptographic signature verification module 208. The mnemonic sentence generation module 202 generates the mnemonic sentence 110 from pseudorandom data. The pseudorandom data may be generated from a seed number or vector using a deterministic algorithm. In some embodiments, the seed may be obtained from a user. The mnemonic sentence generation module 202 may apply an entropy function on the pseudorandom data to obtain a cryptographically secured pseudorandom data. The entropy function may be used to measure uncertainty associated with the pseudorandom data. Applying the entropy function to unsecure pseudorandom data may result in obtaining secure pseudorandom data. In some embodiments, this is implemented in pseudocode, as follows:
ent:=getSecureRandomBits(128)
In some embodiments, the entropy function is applied on 128 bits of the pseudorandom data to obtain the cryptographically secured pseudorandom data.

The mnemonic sentence generation module 202 may apply a first cryptographic hash function on the cryptographically secured pseudorandom data to obtain a hash value. The first cryptographic hash function and the second cryptographic hash function are not limited to any particular cryptographic hash function. In some embodiments, he first cryptographic hash function and the second cryptographic hash function are different from each other. In some embodiments the cryptographic hash function and the second cryptographic hash function may be selected from one of a Secure Hash Algorithm (SHA) function, a Merkle-Damgard 5 (MD5) message digest algorithm function, and a Research and Development in Advanced Communications Technologies in Europe (RACE) Integrity Primitives Evaluation Message Digest (RIPEMD) algorithm function. For example, in some embodiments, the first cryptographic hash function is a Secure Hash Algorithm (SHA) 256 function. In some embodiments, this is implemented on pseudocode, as follows:

hash:=sha256(ent)

In some embodiments, a SHA256 function is applied on the cryptographically secured pseudorandom data to obtain the hash value. The mnemonic sentence generation module 202 may apply a checksum function on at least one bit of the hash value to obtain a checksum. The checksum function may output a significantly different value even for small changes made to the input, and hence may be used to detect errors in the data. In some embodiments, this is implemented on pseudocode, as follows:

cs:=hash & 0b1111

In some embodiments, the checksum function is applied on the least significant 4 bits of the hash value obtained earlier to obtain the checksum. The checksum may be appended to the hash value to obtain a plurality of bits. The plurality of bits may be divided into a plurality of groups and each group corresponds to a natural language word, to obtain a list of natural language words. In some embodiments, this is implemented on pseudocode, as follows:

```
ent := ent ⁀ cs
words := [ ]
foreach 0..12 {
    words.append(WordList[ent & 0b11111111111])
    ent := ent >> 11
}
```

In some embodiments, the plurality of bits is divided into 12 groups and each group corresponds to a natural language word of 11 bits to obtain the list of natural language words. The natural language words are concatenated to obtain the mnemonic sentence 110. In some embodiments, this is implemented on pseudocode, as follows:

ms:=words.join(" ")

The key generation module 204 may apply a key derivation algorithm on the mnemonic sentence 110 and the PIN 112 to obtain a recovery key. In some embodiments, the recovery Key is a 256-bit Elliptic Curve private key. The key derivation algorithm includes a second cryptographic function, which is iteratively applied on the mnemonic sentence 110 and the PIN 112 to obtain the recovery key. In some embodiments, the PIN 112 is a 6 digit PIN. The key derivation algorithm may be a Password Based Key Derivation Function 2 (PBKDF2) algorithm. In some embodiments, this is implemented on pseudocode, as follows:

k:=PBKDF2-HMAC-SHA256(ms, pin, 10000)

An iteration count of the PBKDF2 algorithm may set to 10,000 and HMAC-SHA256 may be used as the second cryptographic hash function, resulting in a key that is 256-bits in length. The mnemonic sentence 110 may be generated independently from cryptographically secure pseudorandom data, based on the industry standard BIP0039. In some embodiments the first cryptographic function and the second cryptographic function are different. In some embodiments the first cryptographic hash function and the second cryptographic hash function are selected from one of a Secure Hash Algorithm (SHA) function, a Merkle-Damgård 5 (MD5) message digest algorithm function, and a Research and Development in Advanced Communications Technologies in Europe (RACE), Integrity Primitives Evaluation Message Digest (RIPEMD) algorithm function.

In some embodiments, the key derivation algorithm is selected from one of a PBKDF, an Argon2 key derivation function, a Scrypt key derivation function, and a Lyra key generation function.

The recovery key ID registration module 206 includes a cryptographic signature verification module 208. The recovery key ID registration module 206 conditionally registers an identifier of the recovery key for the first public key of the first device 104 in a smart contract in the blockchain 108. In some embodiments, the identifier of the recovery key is a hash of the recovery key. The cryptographic signature verification module 208 conditionally registers the identifier of the recovery key in the smart contract in the blockchain 108 if a first cryptographic signature from the first public key of the first device 104 applied on a hash of the recovery key and a second cryptographic signature from the recovery key applied on a hash of the first public key of the first device 104 are verified. In some embodiments, the first cryptographic signature and the second cryptographic signature are Elliptic Curve Digital Signature Algorithm (ECDSA) signatures. The smart contract may register an association between the first public key of the first device 104 and the second public key of the second device 106 by forming an equivalence relation between the hash of the recovery key corresponding to the first public key of the first device 104 and the hash of the recovery key corresponding to the second public key of the second device 106.

Figure 3:
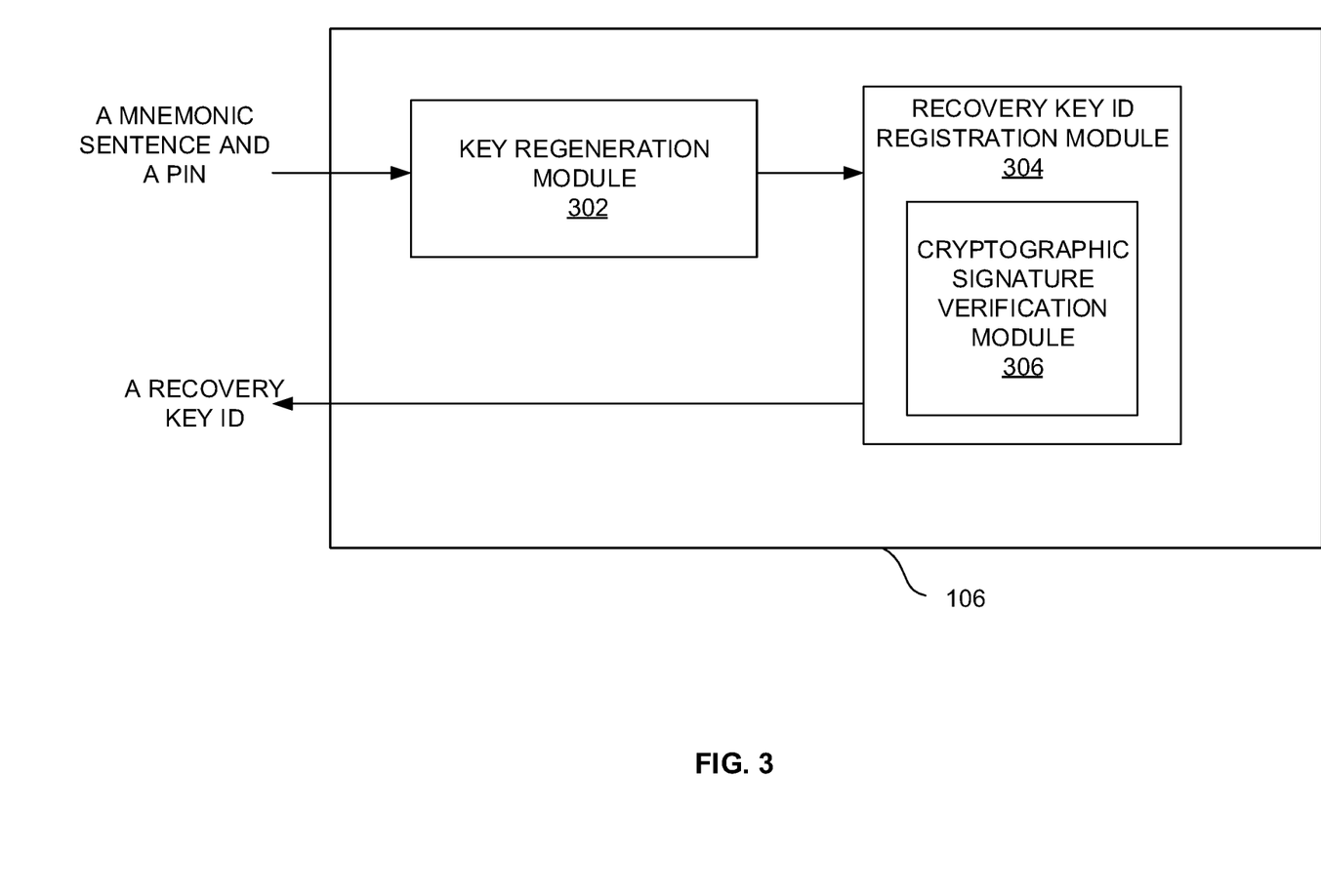
FIG. 3 is a block diagram of the second device of FIG. 1 according to some embodiments herein.

FIG. 3 is a block diagram of the second device 106 according to some embodiments herein. The second device 106 includes a key regeneration module 302 and a recovery key ID registration module 304. The recovery key ID registration module 304 includes a cryptographic signature verification module 306. The key regeneration module 302 obtains the mnemonic sentence 110 and the PIN code 112 from the user 102 of the second device 106 to regenerate the recovery key, in some embodiments. The key regeneration module 302 may apply a key derivation algorithm to generate a second recovery key. The key derivation algorithm may include a cryptographic hash function. The cryptographic hash function may be applied iteratively to the mnemonic sentence 110 and the PIN code 112 to obtain the second recovery key.

The recovery key ID registration module 304 conditionally registers an association between the first public key of the first device 104 and the second public key of the second device 106 in a smart contract in a blockchain. In some embodiments, the identifier of the recovery key is a hash of the recovery key. The smart contract registers the association between the first public key of the first device 104 and the second public key of the second device 106 if the first recovery key generated by the first device 104 matches with the second recovery key generated on the second device 106 of FIG. 1 according to some embodiments herein. The cryptographic signature verification module 306 may verify the third cryptographic signature from the second public key of the second device 106 applied on a hash of the recovery key and a fourth cryptographic signature from the recovery key applied on a hash of the second public key of the second device 106 to register the association between the first public key of the first device 104 and the second public key of the second device 106.

In some embodiments, the smart contract registers the association between the first public key of the first device 104 and the second public key of the second device 106 only if the first cryptographic signature from the first public key of the first device 104 applied on a hash of the recovery key and a second cryptographic signature from the recovery key applied on a hash of the first public key of the first device 104 are verified, and a third cryptographic signature from the second public key of the second device 106 applied on a hash of the recovery key and a fourth cryptographic signature from the recovery key applied on a hash of the second public key of the second device 106 are verified.

In some embodiments, the first device 104 may delegate a revoke permission to the second device 106 by signing a revoke transaction as follows:

Delegate (CredAPubKey, CredBPubKey, REVOKE) signed by CredAPrivKey

In some embodiments, the first device 104 may delegate a takeover permission to the second device 106 by signing a takeover transaction as follows:

Delegate (CredAPubKey, {CredBPubKey}, TAKEOVER) signed by CredAPrivKey.

Figure 4:
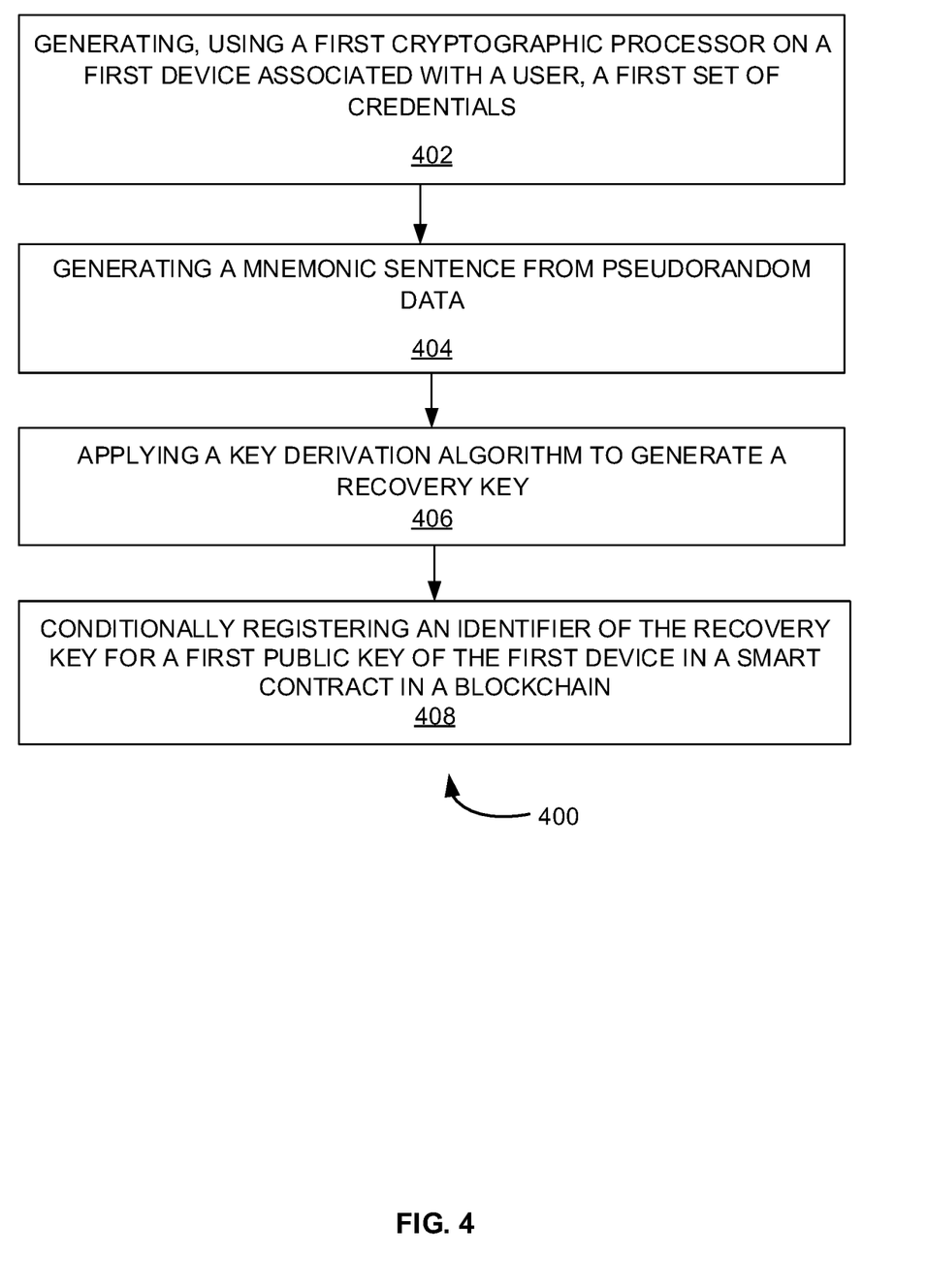
FIG. 4 is a flow diagram illustrating a method for generating a recovery key for a first device associated with a user and conditionally registering an identifier of the recovery key for a first public key of the first device of FIG. 1 in a blockchain according to some embodiments herein.

FIG. 4 is a flow diagram 400 illustrating a method for generating a recovery key for the first device 104 associated with the user 102 and conditionally registering an identifier of the recovery key for a first public key of the first device 104 of FIG. 1 in a blockchain according to some embodiments herein. At step 402, a first set of credentials is generated, using a hardware-based cryptographic processor on the first device 104 associated with the user 102. The first set of credentials includes a first blockchain-compatible public-private key pair associated with the user 102. The first blockchain-compatible public-private key pair includes a first public key and a first private key. The first private key is restricted to the first cryptographic processor on the first device 104. At step 404, the mnemonic sentence 110 is generated from pseudorandom data. At step 406, a key derivation algorithm is applied to generate the recovery key. Applying the key derivation algorithm may include iteratively applying a second cryptographic hash function to the mnemonic sentence 110 and the PIN code 112. At step 408, an identifier of the recovery key is conditionally registered for the first public key of the first device 104 in a smart contract in the blockchain 108.

Figure 5:
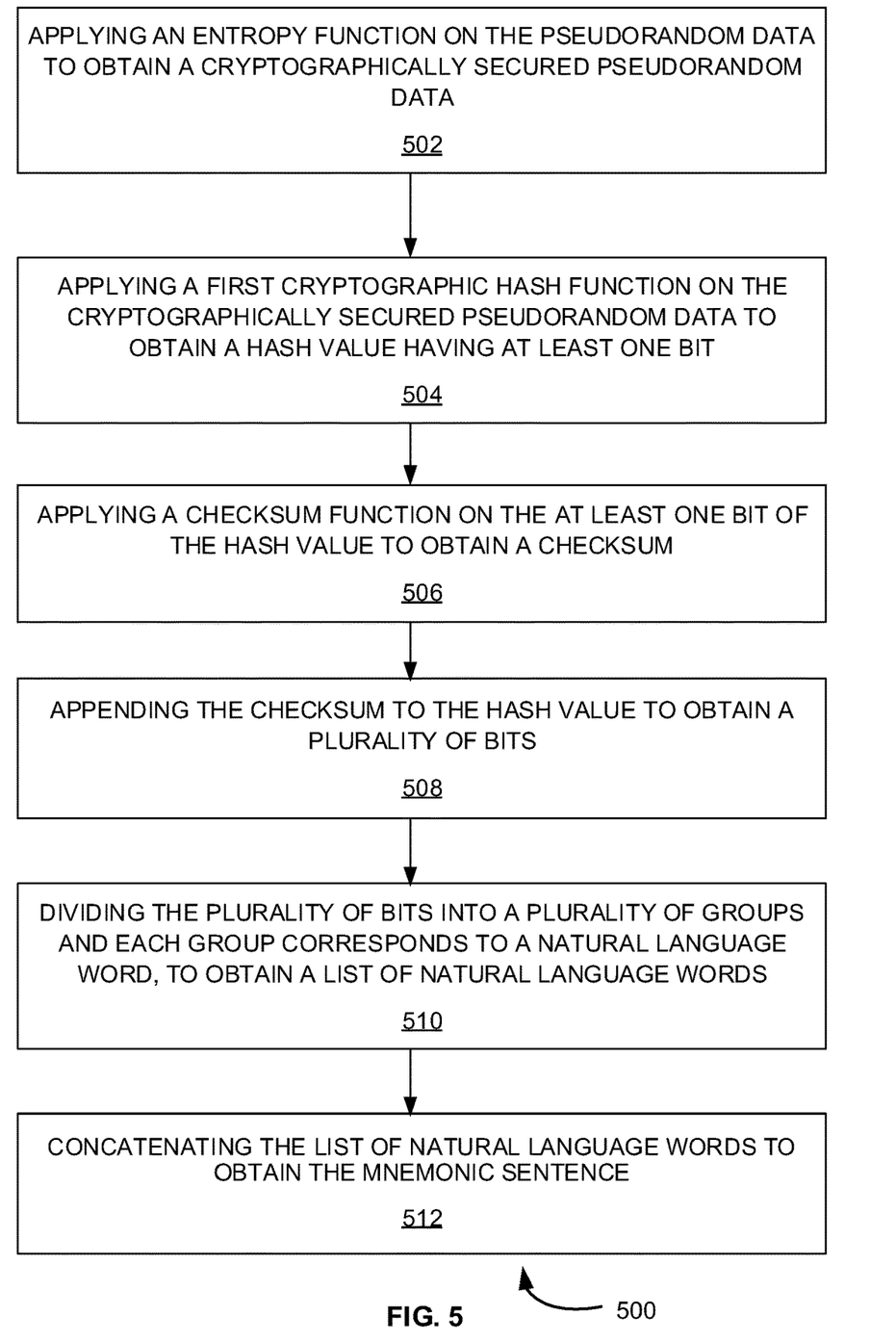
FIG. 5 is a flow diagram illustrating a method for generating a mnemonic sentence from pseudorandom data of FIG. 1 according to some embodiments herein.

FIG. 5 is a flow diagram illustrating a method 500 for generating the mnemonic sentence 110 from the pseudorandom data of FIG. 1 according to some embodiments herein. At step 502, an entropy function is applied on the pseudorandom data to obtain a cryptographically secured pseudorandom data. At step 504, a first cryptographic hash function is applied on the cryptographically secured pseudorandom data to obtain a hash value having at least one bit. At step 506, a checksum function is applied on at least one bit of the hash value to obtain a checksum. At step 508, the checksum is appended to the hash value to obtain a plurality of bits. At step 510, the plurality of bits is divided into a plurality of groups. Each group corresponds to a natural language word, to obtain a list of natural language words. At step 512, the list of natural language words is concatenated to obtain the mnemonic sentence 110.

Figure 6:
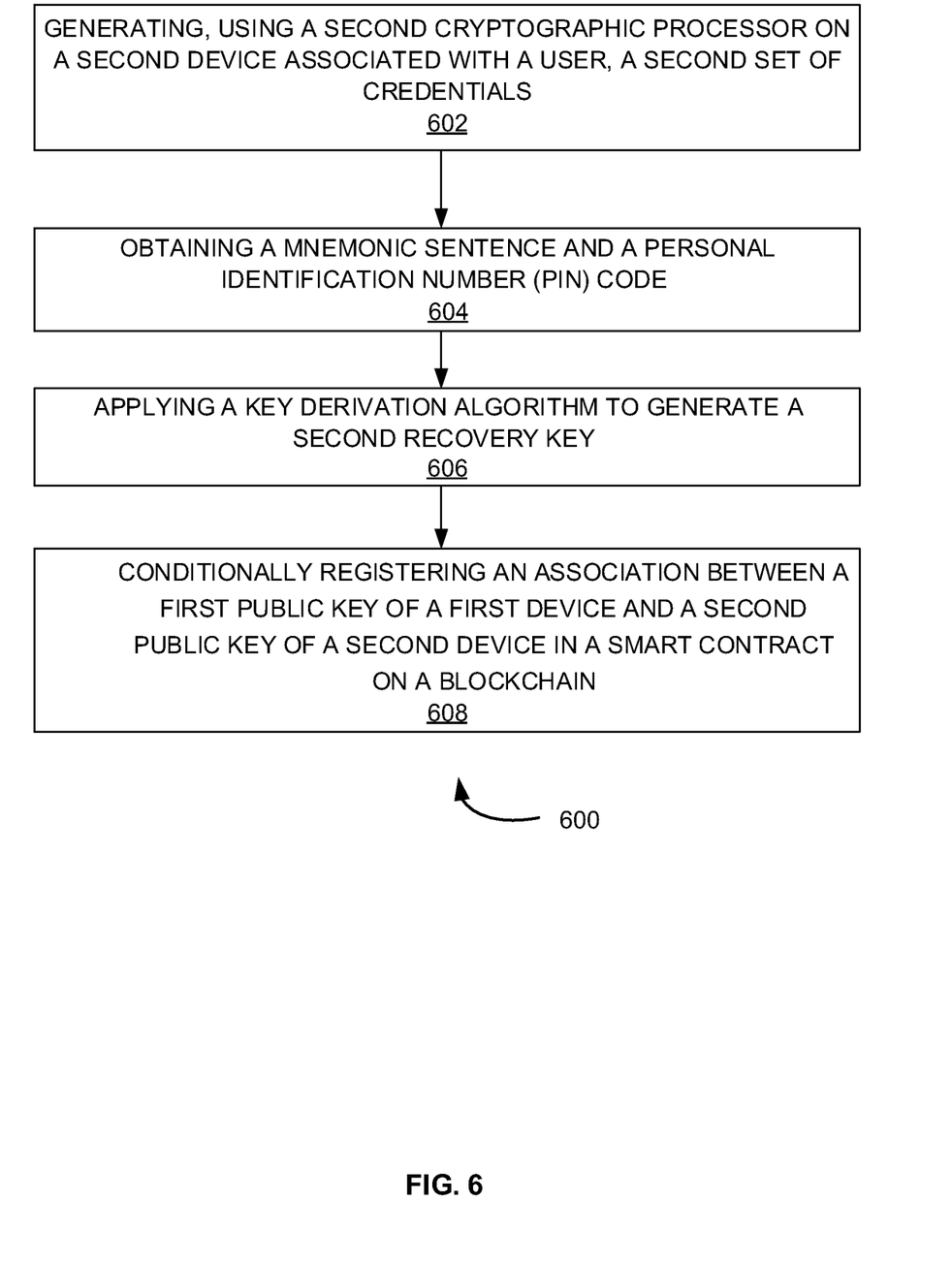
FIG. 6 is a flow diagram illustrating a method for conditionally registering an association between a first public key of the first device and a second public key of the second device of FIG. 1 in the blockchain according to some embodiments herein.

FIG. 6 is a flow diagram illustrating a method 600 for conditionally registering an association between a first public key of the first device 104 and a second public key of the second device 106*e* of FIG. 1 in the blockchain according to some embodiments herein. At step 602, a second set of credentials that includes a second blockchain-compatible public-private key pair is generated, using a hardware-based cryptographic processor on the second device 106 associated with the user 102. The second blockchain-compatible public-private key pair includes the second public key and a second private key. The second private key is restricted to the second cryptographic processor on the second device 106. At step 604, a mnemonic sentence 110 and the PIN code 112 are obtained. At step 606, a key derivation algorithm is applied to generate a second recovery key. Applying the key derivation algorithm may include iteratively applying a cryptographic hash function on the mnemonic sentence 110 and the PIN code 112 to regenerate the second recovery key. At step 608, an association between the first public key of the first device 104 and the second public key of the second device 106 is conditionally registered in a smart contract on the blockchain 108. The first recovery key is generated on the first device 104 and the second recovery key is generated on the second device 106.

Figure 7:
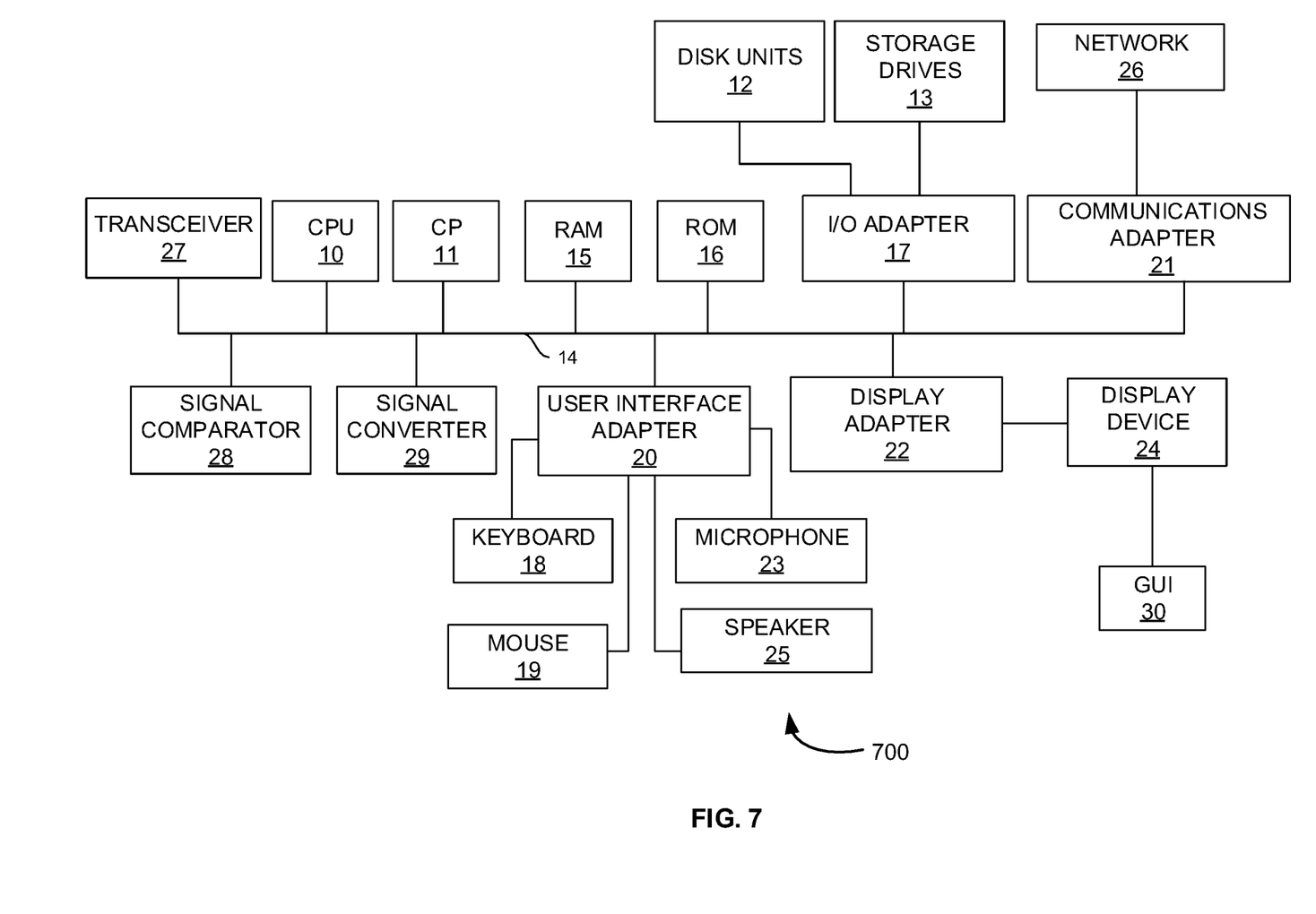
FIG. 7 is a block diagram of a schematic diagram of a device used in accordance with some embodiments herein.

FIG. 7 is a block diagram of a schematic diagram of a device used in accordance with some embodiments herein. The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 7, with reference to FIGS. 1 through 6. This schematic drawing illustrates a hardware configuration of a server/computer system/user device in accordance with the embodiments herein. The user device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for conditionally registering an association between a first public key of a first device and a second public key of a second device in a blockchain, comprising:
   a processor configured to:
      receive a mnemonic sentence and a Personal Identification Number (PIN) code;
      apply a key derivation algorithm to generate a second recovery key, wherein applying the key derivation algorithm comprises iteratively applying a cryptographic hash function to the mnemonic sentence and the Personal Identification Number (PIN) code; and
      conditionally register the association between the first public key of the first device and the second public key of the second device in a smart contract in the blockchain;
   wherein the first device and the second device are associated with a user, wherein a first blockchain-compatible public-private key pair comprises the first public key and a first private key, wherein the first private key is restricted to a first cryptographic processor on the first device, wherein the first cryptographic processor on the first device generates a first set of credentials comprising the first blockchain-compatible public-private key pair, wherein the first device generates a first recovery key for the first device and registers a first recovery key identifier in the smart contract in the blockchain, wherein a second block-chain compatible public-private key pair comprises the second public key and a second private key, wherein the second private key is restricted to a second cryptographic processor on the second device, and wherein the second cryptographic processor on the second device generates a second set of credentials comprising the second blockchain-compatible public-private key pair.

2. The system of claim 1, wherein the smart contract in the blockchain registers the association between the first public key of the first device and the second public key of the second device if the first recovery key matches the second recovery key.

3. The system of claim 1, wherein the smart contract in the blockchain registers the association between the first public key of the first device and the second public key of the second device if a first cryptographic signature from the first public key of the first device applied on a first hash of the first recovery key and a second cryptographic signature from the first recovery key applied on a second hash of the first public key of the first device are verified, and a third cryptographic signature from the second public key of the second device applied on a hash of the second recovery key and a fourth cryptographic signature from the second recovery key applied on a hash of the second public key of the second device are verified.

4. The system of claim 1, wherein the processor is further configured to:
   in response to determining that the association between the first public key of the first device and the second public key of the second device is conditionally registered in the smart contract in the blockchain, use the second set of credentials to replace, recover, revoke or take over the first set of credentials.

5. The system of claim 1, wherein conditionally registering the association between the first public key of the first device and the second public key of the second device comprises registering a second recovery key identifier in the smart contract in the blockchain.

6. The system of claim 1, wherein conditionally registering the association forms an equivalence relation between the first public key of the first device and the second public key of the second device.

7. The system of claim 1, wherein conditionally registering the association forms an equivalence relation between a third hash of the first recovery key and a fourth hash of the second recovery key.

8. The system of claim 1, wherein the first set of credentials comprises a username and a password.

9. The system of claim 1, wherein the second set of credentials comprises a username and a password.

10. The system of claim 1, wherein the first recovery key is generated using the mnemonic sentence and the Personal Identification Number (PIN) code.

11. The system of claim 1, wherein the mnemonic sentence is generated from pseudorandom data.

12. The system of claim 11, wherein the cryptographic hash function is a second cryptographic hash function, wherein generating the mnemonic sentence from the pseudorandom data comprises:
   applying an entropy function on the pseudorandom data to obtain a cryptographically secured pseudorandom data;
   applying a first cryptographic hash function on the cryptographically secured pseudorandom data to obtain a hash value having at least one bit; and
   applying a checksum function on the at least one bit of the hash value to obtain a checksum.

13. The system of claim 12, wherein generating the mnemonic sentence from the pseudorandom data further comprises:
   appending the checksum to the hash value to obtain a plurality of bits;
   dividing the plurality of bits into a plurality of groups, wherein each group corresponds to a natural language word, to obtain a list of natural language words; and
   concatenating the list of natural language words to obtain the mnemonic sentence.

14. The system of claim 12, wherein the first cryptographic hash function and the second cryptographic hash function are selected from one of a Secure Hash Algorithm (SHA) function, a Merkle-Damgård 5 (MD5) message digest algorithm function, and a Research and Development in Advanced Communications Technologies in Europe (RACE), Integrity Primitives Evaluation Message Digest (RIPEMD) algorithm function.

15. The system of claim 1, wherein the key generation algorithm is selected from one of a Password Based Key Derivation Function (PBKDF), an Argon2 key derivation function, a Scrypt key derivation function, and a Lyra key generation.

16. A method for conditionally registering an association between a first public key of a first device and a second public key of a second device in a blockchain, comprising:
   receiving a mnemonic sentence and a Personal Identification Number (PIN) code;
   applying a key derivation algorithm to generate a second recovery key, wherein applying the key derivation algorithm comprises iteratively applying a cryptographic hash function to the mnemonic sentence and the Personal Identification Number (PIN) code; and
   conditionally registering the association between the first public key of the first device and the second public key of the second device in a smart contract in the blockchain;
   wherein the first device and the second device are associated with a user, wherein a first blockchain-compatible public-private key pair comprises the first public key and a first private key, wherein the first private key is restricted to a first cryptographic processor on the first device, wherein the first cryptographic processor on the first device generates a first set of credentials comprising the first blockchain-compatible public-private key pair, wherein the first device generates a first recovery key for the first device and registers a first recovery key identifier in the smart contract in the blockchain, wherein a second block-chain compatible public-private key pair comprises the second public key and a second private key, wherein the second private key is restricted to a second cryptographic processor on the second device, and wherein the second cryptographic processor on the second device generates a second set of credentials comprising the second blockchain-compatible public-private key pair.

17. A computer program product for conditionally registering an association between a first public key of a first device and a second public key of a second device in a blockchain, the computer program product being embodied in a non-transitory computer readable storage medium and comprising computer instructions for:
   receiving a mnemonic sentence and a Personal Identification Number (PIN) code;
   applying a key derivation algorithm to generate a second recovery key, wherein applying the key derivation algorithm comprises iteratively applying a cryptographic hash function to the mnemonic sentence and the Personal Identification Number (PIN) code; and
   conditionally registering the association between the first public key of the first device and the second public key of the second device in a smart contract in the blockchain;
   wherein the first device and the second device are associated with a user, wherein a first blockchain-compatible public-private key pair comprises the first public key and a first private key, wherein the first private key is restricted to a first cryptographic processor on the first device, wherein the first cryptographic processor on the first device generates a first set of credentials comprising the first blockchain-compatible public-private key pair, wherein the first device generates a first recovery key for the first device and registers a first recovery key identifier in the smart contract in the blockchain, wherein a second block-chain compatible public-private key pair comprises the second public key and a second private key, wherein the second private key is restricted to a second cryptographic processor on the second device, and wherein the second cryptographic processor on the second device generates a second set of credentials comprising the second blockchain-compatible public-private key pair.

* * * * *